US006567619B1

(12) United States Patent
Glogovsky

(10) Patent No.: US 6,567,619 B1
(45) **Date of Patent: *May 20, 2003**

(54) SYSTEM AND METHOD FOR NOTIFYING CUSTOMERS OF FILM DEVELOPMENT

(75) Inventor: Terence M. Glogovsky, Sugar Hill, GA (US)

(73) Assignee: NCR Corporation, Dayton, OH (US)

(*) Notice: Subject to any disclaimer, the term of this patent is extended or adjusted under 35 U.S.C. 154(b) by 148 days.

This patent is subject to a terminal disclaimer.

(21) Appl. No.: 09/604,493

(22) Filed: Jun. 27, 2000

(51) Int. Cl.[7] .......................... G03B 29/00; G03D 13/00

(52) U.S. Cl. ........................ 396/429; 396/564; 396/567; 396/578; 355/40

(58) Field of Search ................................ 396/319, 429, 396/564, 567, 578; 355/27, 40, 41; 358/487, 527

(56) References Cited

U.S. PATENT DOCUMENTS 5,477,353 A * 12/1995 Yamasaki .................... 358/487
5,666,215 A * 9/1997 Fredlund et al. ............ 358/487
5,760,916 A * 6/1998 Dellert et al. ............... 348/211
5,760,917 A * 6/1998 Sheridan ...................... 348/211
5,784,461 A * 7/1998 Shaffer et al. ................ 355/18
5,799,219 A * 8/1998 Moghadam et al. .......... 355/40
5,949,551 A * 9/1999 Miller et al. ................ 348/211
6,017,157 A * 1/2000 Garfinkle et al. ............. 355/40
6,157,435 A * 12/2000 Slater et al. .................. 355/40
6,169,597 B1 * 1/2001 Sala ............................ 355/27
6,203,217 B1 * 3/2001 Glogovsky .................. 396/564
6,222,993 B1 * 4/2001 Smart et al. .................. 355/40
6,283,646 B1 * 9/2001 Dellert et al. ............... 396/564

FOREIGN PATENT DOCUMENTS

EP 0 856 972 A2 * 8/1998
EP 0 878 956 A1 * 11/1998

* cited by examiner

*Primary Examiner*—Alan A. Mathews
(74) *Attorney, Agent, or Firm*—Maginot, Moore & Bowman LLP; Paul W. Martin

(57) ABSTRACT

A system and method provide reliable and effective notification to customers that film rolls they have deposited with a vendor for processing have been returned and are available for retrieval. The method includes storing customer identification data in a data repository that accompanies a film roll container, reading customer identification data from the data repository after development of the film roll in the film container, and generating a notification message for delivery to the customer corresponding to the customer identification data. The notification message informs the customer that the developed film is available for retrieval from the deposit site. Entry of the data for storage in the data repository may be performed by a customer or deposit site employee through a keypad or through a scanning device that reads a customer token.

20 Claims, 3 Drawing Sheets

SYSTEM AND METHOD FOR NOTIFYING CUSTOMERS OF FILM DEVELOPMENT

CROSS REFERENCE

Cross reference is made to copending U.S. patent application Ser. No. 09/604,495 entitled "System and Method for Notifying Itinerants of Film Development" by Terence M. Glogovsky and Ser. No. 09/604,494 entitled "System and Method for Identifying Film Rolls During Development Processing" by Glogovsky et al., both of which are assigned to the same assignee as the present invention, and both are filed concurrently herewith.

FIELD OF THE INVENTION

This invention relates generally to methods and systems for tracking items entrusted to an establishment for service or repair and, more particularly, to methods and systems for tracking film entrusted to an establishment for development.

BACKGROUND OF THE INVENTION

Many casual photographers use camera film that they have developed by commercial vendors. These vendors typically have the customers write data onto an envelope in which their photographs and negatives are returned. The film roll container is then placed in the envelope and sent to a photo processing lab. At the lab, the film roll is developed and the negatives and developed photographs are sealed in the envelope from which the film was retrieved. The envelope is then returned to the vendor's location where the customer deposited the film roll container, which is typically a retail store.

When a customer deposits the film roll container, a sign usually informs the customer that film deposited on that day is returned to that location on a particular date. The customer then knows to return to the store on or after that date to pick up the developed film and photographs. This method puts the onus on the customer to check with the store and see if the film has been returned from the processing lab. Customer frustration arises whenever the customer returns after the designated date for the developed photographs and the envelope with the developed film is not available. A variety of reasons exist for this problem. For one, the photo processing lab may have been inundated with significant number of film containers and delays in processing occur from the unanticipated volume. For example, holidays and graduations cause people to take many photographs and submit their film for development. Customers are informed by the personnel at the deposit location that they are unaware of the cause of the delay at the processing lab and that the customer must call or return to the deposit location at a later time for the processed film. Other reasons for film processing delays include development equipment failure and errors in handling film rolls during processing.

Another customer problem may occur when a customer deposits more than one film container. Each film container requires a separate envelope. Handling of the envelope, either during shipment or processing, by various personnel may cause envelopes containing film containers deposited at the same time to be separated. Consequently, the film may be processed at different times and returned to the location where they were deposited at different times. Again, the customer must check with the deposit location until all of the envelopes are returned. If the customer wants to view some of the photographs before all of them are returned, multiple trips must be made to the deposit location. Frustration with multiple trips or telephone calls to determine when a customer may retrieve developed photos may cause a customer to shop and have film developed at a business other than the deposit location.

One way of addressing these problems would be to notify customers directly when envelopes containing their developed film have been received at the location where the film was deposited. Such service would require someone to inventory the received envelopes each day. Then the person would need to call each person identified on the envelope to inform them of the arrival of the envelope. If the customer's phone was busy or the customer did not have an answering machine, the person at the deposit location may expend a significant amount of time on the notification tasks rather than tasks that might contribute more directly to the profitability of the business. Consequently, the overhead costs associated with such service are usually deemed too cost prohibitive for implementation of such service.

What is needed is a way of notifying customers that developed photographs are available for them to retrieve without being cost prohibitive.

What is needed is a way of communication between a photo processing lab and deposit location regarding the status of film rolls being processed.

What is needed is a system that notifies a customer regarding the availability of each film roll deposited for processing.

What is needed is a system that continues to notify a customer regarding the availability of developed film rolls until the customer is provided a reasonable opportunity to retrieve the rolls.

SUMMARY OF THE INVENTION

The above-noted limitations of previously known methods for receiving and returning developed film have been overcome by a system and method that operate in accordance with the principles of the present invention. The method of the present invention includes storing customer identification data in a data repository that accompanies a film roll container, reading customer identification data from the data repository after development of the film roll in the film container, and generating a notification message for delivery to the customer corresponding to the customer identification data. The notification message informs the customer that the developed film is available for retrieval from the deposit site. Entry of the data for storage in the data repository may be performed by a customer or deposit site employee through a keypad or through a scanning device that reads a customer token.

The method may be implemented with a system made in accordance with the principles of the present invention. The system includes a data capture device for reading customer identification and film roll data, a data server for storing the data in a data repository, and a notification message generator for generating a notification message to the customer corresponding to the customer identification data. The data capture device may be a keypad or barcode reader at the film container deposit site. Data identifying the customer may be entered manually through the keypad by employees of the site or by a customer responding to questions displayed on a screen located near the keypad. When the data capture device is a barcode reader, a deposit site may issue customer tokens, such as plastic cards, that contain customer identification data encoded in a bar code or magnetic stripe affixed to the token. The data capture device may use the data read from the customer token to print a label having legible data and/or a bar code that identifies the customer, the film container, and the deposit site. This label may be applied to an envelope in which the film container is placed or it may be applied directly to the film container. Once the film has been developed at a photo processing lab, the data may be read from the label and used by a server at the photo processing lab to generate status update messages. The status update messages may be electronic mail (email) messages that are sent to the server at the deposit site. Additionally, one or more of the status messages may be addressed to the user's email address as identified in the customer data read from the label. Alternatively, the server at the deposit site may send to the customer as notification messages one or more of the status messages received from the photo processing lab. Notification messages may also be voice mail messages that are delivered via an automated telemarketing system to the customer. In another embodiment of the present invention, the server at the deposit site may obtain data from a data repository accompanying a developed film roll shipped to the deposit site to update its records regarding the status of the film container and then generate one or more notification messages to the customer. The notification message(s) may be delivered to a customer via email as voice mail. Once a customer receives the notification message via email or by phone, the customer may confidently return to the deposit site and retrieve the developed photographs.

It is an object of the present invention to provide to customers notification regarding the availability of developed film rolls for retrieval.

It is an object of the present invention to provide communication between deposit sites and processing labs.

It is an object of the present invention to provide availability notification to a customer regarding each film roll deposited by a customer.

It is an object of the present invention to provide reasonably sufficient notice to a customer of a developed film roll's availability for retrieval that customer notification is reliable and effective.

These and other advantages and features of the present invention may be discerned from reviewing the accompanying drawings and the detailed description of the invention.

BRIEF DESCRIPTION OF THE DRAWINGS

The present invention may take form in various circuit and method components and arrangement of circuit and method components. The drawings are only for purposes of illustrating an exemplary embodiment and are not to be construed as limiting the invention.

DETAILED DESCRIPTION OF THE INVENTION

Figure 1:
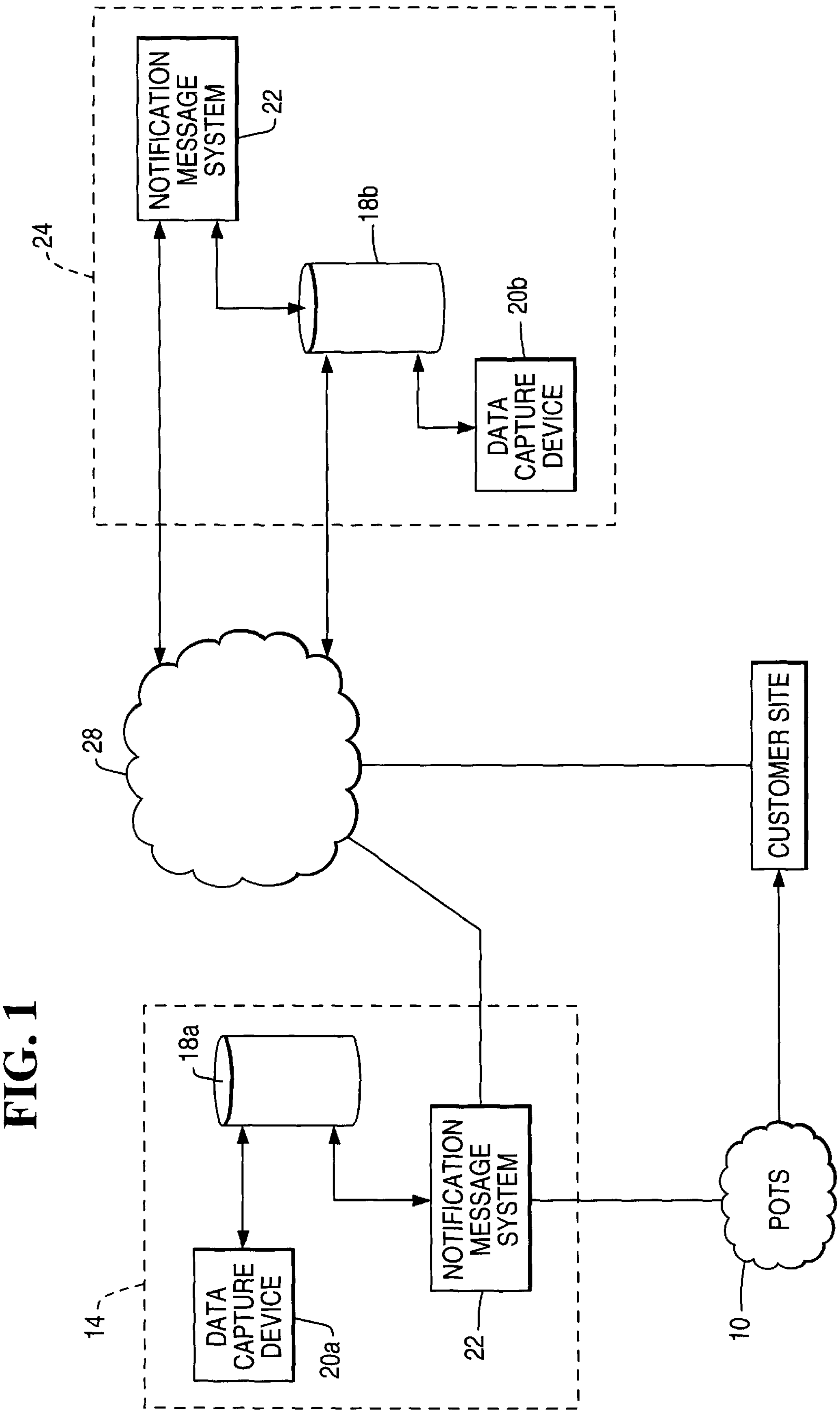
FIG. 1 depicts a block diagram of a system that may be used to notify a customer of a developed film roll being available for retrieval.

A system embodying the present invention is shown in FIG. 1. System 10 may include a deposit site 14, a lab site 24, and a customer site. Deposit site 14 includes a store server 18*a,* a data capture device 20*a,* and a notification in message system 22. Data capture device 20*a* is operatively coupled to server 18*a* and may be a barcode or magnetic stripe reader to read customer information stored on a customer token such as a plastic card having a magnetic stripe or barcode affixed thereto. Data capture device 20*a* may also be a keypad through which a customer or deposit site employee may enter customer and film roll data. Store server 18*a* uses customer data, film roll data, and deposit site data to generate a data repository that may accompany the film roll to a processing lab. Film roll data may be entered through a keypad or, if a bar code is affixed to the exterior of the film roll, a bar code reader may be used to read it. The deposit site data identifies the deposit site location and may be stored in server 18*a.* These various data correlate the customer, film roll container, and deposit site to one another. The data repository containing this data may be a label or bar code that may be applied using adhesive to the film roll container for tracking during its transfer to and from a photo processing lab. These data may also be used to generate a data record that is stored in server 18*a,* preferably in a database, for accounting purposes.

As discussed more fully below, notification message system 22 generates and sends to a customer a message informing the customer of the availability of the customer's developed film. Notification system 22 may be a separate email server, email software resident on server 18*a,* or an automated voice attendant system. When notification system 22 is an email server or software, the notification message is an email message sent to the customer's email address identified in the customer data. When notification system 22 is an automated voice attendant system, server 18*a* issues a command to system 22 to reserve a voicemail box on the system for a customer identified by customer data entered through capture device 20*a.* The customer is given the telephone number for accessing the voice attendant system and the code for interrogating the voicemail box reserved for the customer. The notification message is then stored in the reserved voicemail box and when the customer hears notification that the developed film is available, the customer may return to deposit site 14 to retrieve the film. Delivery of the developed film to the customer is communicated to server 18*a* so it may send a command to system 22 to delete the association between the customer and the reserved voicemail box. Alternatively, notification message system 22 may be an automated voice system such as those used by telemarketing firms that deliver a synthesized or recorded voice message to a telephone number.

Using like numerals for like components, system 10 may also include a processing lab site 24 that may include a lab server 18*b* operatively coupled to a data capture device 20*b.* While lab server 18*b* and data capture device 20*b* may be identical to those at deposit site 14, they need not necessarily be the same. They should be capable of reading and processing data generated by one another if servers at each site are used to implement the present invention. In an embodiment of the present invention, servers 18*a* and 18*b* may be computer systems that use Pentium processors operating at 266 MHz, having 64 MB of RAM and a hard disk storage capacity of 4.3 GB. Servers 18*a* and 18*b* may use the Windows 95 or higher operating system or equivalent. Data capture device 20*a* and 20*b* may be a barcode reader such as an NCR 7890 model barcode scanner manufactured by NCR of Duluth, Georgia or a keypad such as the keyboard of server 14*a* or 14*b* or a keypad such as a model 5100 manufactured by NCR of Columbia, South Carolina. As discussed more fully below, lab site 24 may or may not include a notification message system 22 when a lab site 24 is used to implement the present invention.

At lab site 24, data capture device 20*b* reads the data repository accompanying a film roll container delivered to the site. This data may be stored in server 18*b*, preferably in a database, to track the status of the film roll processing at site 24. An alternative repository may be generated by server 18*b* to accompany the film roll during processing or the film roll container and its accompanying data repository may remain associated with the film during the film development process. Server 18*b* may also generate an electronic status message for transmission to server 18*a*. The communication of the status message may be made via a point-to-point communication path through a dial-up modem connection or it may be provided through an email service over a global computer communication network 28 such as the Internet. Server 18*a* may use status messages to update the status of the film container identified in the corresponding data record being maintained at server 18*a*.

After development of a roll of film, data capture device 20*b* may be used to read the data repository accompanying the developed film roll and update the status of the corresponding data record stored in server 18*b*. Again, server 18*b* may generate an electronic status message for communication to server 18*a* and server 18*a* may also update the status of the corresponding data record kept at server 18*a*. Server 18*b* may also use the customer data stored in the corresponding data record to send to the customer's email address via notification message system 22, a copy of the message sent to server 18*a*. This message informs the customer that the film roll deposited by the customer had been developed and may also include an estimated date for delivery of the developed film to deposit site 14 so the customer may plan for retrieval of the developed film. At shipment of the developed film roll, a data repository is associated with the developed film. This repository may be a portion of the original data repository generated by server 18*a*, such as a detachable segment, or another data repository generated by server 18*b*. Server 18*b* may again update its corresponding data record and send messages regarding shipment to server 18*a* and, if desired, through message system 22 to the customer as well.

Upon receipt of the developed roll at deposit site 14, data capture device 20*a* may be used to read the accompanying data repository and update its corresponding data record. Server 18*a* may then generate a message for transmission to server 18*b* indicating successful receipt of the developed film. In response, server 18*b* may delete the corresponding data record or archive the data for further auditing procedures. In accordance with the principles of the present invention, server 18*a* generates a notification message that indicates the developed film is ready for retrieval. This message is sent to notification message system 22 for delivery to the customer identified in the message generated from the customer data. The message may be an email message that is sent by a separate email server coupled to server 18*a* or by email software resident on server 18*a*. The notification email message is sent to the email address identified by the customer data stored in server 18*a*.

In another embodiment of the present invention, the notification message may be an audible message or a message that may be delivered audibly through an automated voice attendant system or telemarketing system. When notification message system 22 is an automated voice attendant system, the message is stored for access through a voicemail box previously reserved to the customer as noted above. The customer identification number may be used as a password for voicemail access. Using the telephone number of the voice attendant system, the reserved voicemail box number, and the customer identification number, the customer may access the voicemail box to ascertain whether the developed film is ready for retrieval at the deposit site. Upon retrieval, server 18*a* may be notified through data capture device 20*a* or other data entry method so server 18*a* may generate a command to notification system 22 to delete the association between a customer identification code and the reserved mail box. In this manner, mailboxes only remained assigned to a customer during the period in which the customer's film is being processed for development.

An automated telemarketing telephone system may also be used for system 22. Upon generation of the notification message, server 18*a* provides the message and a telephone number from the corresponding customer data to system 22. System 22 then calls the customer's telephone number and delivers the message to the person who answers or the answering machine attending the customer's telephone number. In this way, the customer may be notified of the availability of the developed film.

Regardless of the implementation of notification system 22 used in system 10, server 18*a* updates the corresponding data record maintained in its database to reflect the sending of a notification message to the customer identified by the record. Server 18*a* may periodically audit the data records stored in the database to determine whether a notified customer has not retrieved developed film delivered to deposit site 14. Upon detection of such an event, server 18*a* may generate another notification message to the customer and send it to system 22 for delivery to the customer. Preferably, the message informs the customer of the prior notification. After some reasonable number of notification messages have been sent, server 18*a* may generate a log of developed film rolls that have not been retrieved for review by a human operator. Upon retrieval of a developed roll by a customer, server 18*a* is notified so the corresponding data record may be deleted from the database or archived for other audit purposes.

The system of the present invention may be implemented with the components at deposit site 14 alone, the components located at processing site 24 alone or a combination of the components at the two sites. If the components at site 14 are used alone, the data repository generated by server 18*a* accompanies the film roll to site 24 and back. Upon return of the developed roll, server 18*a* updates the status of the corresponding data record and generates a notification message that is delivered by system 22 to the user. If the components at site 24 are used alone, a data repository and data record are generated upon receipt of a film roll at processing site 24. The repository is read upon shipment of the developed roll for updating the corresponding data record and generating notification messages that are delivered by system 22 at site 24 to the customer. This implementation requires the capture of customer data at a deposit site by known manual methods so the data may be entered at site 24 when the roll is received there. When servers are used at both sites, only one notification system 22 is required and preferably it is located at site 14. However, notification message systems may be located at both sites if distribution of the notification task is desired.

Figure 2A:
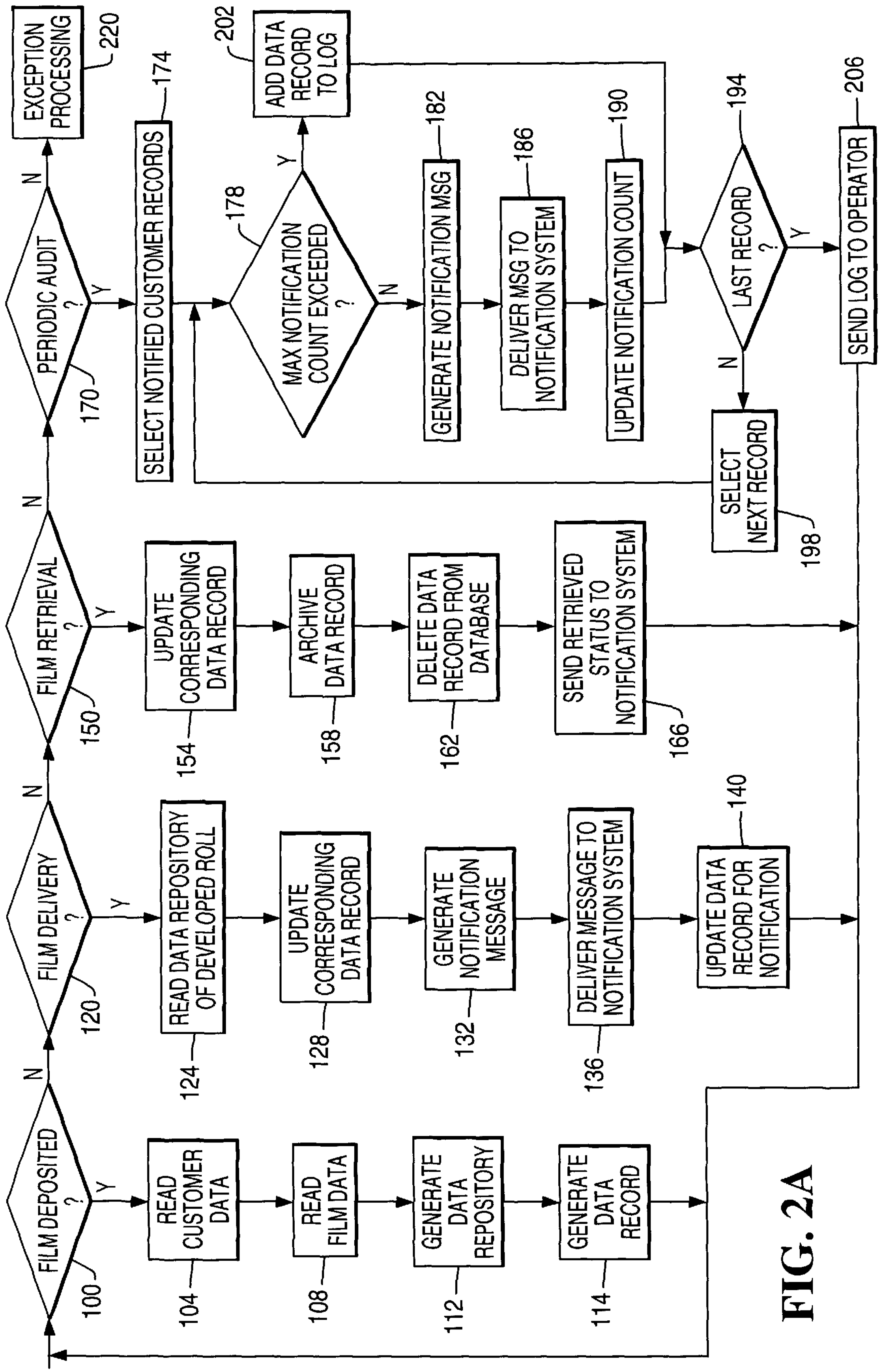
FIG. 2A is a flowchart of an exemplary method for generating customer notification messages regarding availability of developed film rolls for retrieval.

An exemplary method implemented by server 18*a* in accordance with the principles of the present invention is shown in FIG. 2A. The method begins by determining whether a customer has delivered a film roll for processing (Block 100), a developed film roll has been delivered from lab site 24 (Block 120), a customer has retrieved a developed film roll (Block 150), or it is time for a retrieval audit of database records (Block 170). Otherwise, an error has occurred and exception processing takes place (Block 220). In response to determining that data capture device 20*a* is providing data for film being deposited by a customer (Block 100), server 18*a* reads customer data (Block 104) and film roll data (Block 108) to generate a data repository to accompany the film roll (Block 112). A data record is also generated from these data and data corresponding to deposit site 14 (Block 114). The data record is preferably stored in a database coupled to server 18*a*. Server 18*a* continues to scan for data events.

In response to data capture device 20*a* providing data from a developed film roll delivered from a processing lab (Block 120), server 18*a* reads the data obtained by data capture device 20*a* from the data repository accompanying the developed film roll (Block 124). The delivery status of the film roll is updated in the corresponding data record of the database (Block 128). A customer notification message is generated (Block 132) and sent to notification system 22 for delivery to the customer identified by the corresponding database record (Block 136). The database record is updated to indicate a notification message has been sent to the customer (Block 140) and server 18*a* continues to scan for data events.

In response to being notified that a customer has retrieved a developed film roll (Block 150), server 18*a* updates the retrieval status of the corresponding database record (Block 154) and archives the record (Block 158). The database record is then deleted (Block 162) and notification system 22 is informed of the retrieval (Block 166). In response to this notification, an email system may remove the corresponding customer's email address from the address book of the email system. Similarly, a voice attendant system may delete the association of a voicemail box to a customer and a telemarketing system may delete the customer's number from its list of stored telephone numbers.

In response to a determination that a periodic audit of database records for developed film rolls that have not been retrieved should occur (Block 170), server 18*a* selects the database records indicating customer notification has occurred without film roll retrieval (Block 174). For a record in the group of selected records, server 18*a* determines whether the maximum number of customer notifications have already occurred (Block 178). If the maximum number of notifications has not occurred, another notification message is generated (Block 182) and delivered to notification system 22 (Block 186). The customer notification count in the database record is updated (Block 190). If any record indicates the maximum number of customer notifications has been exceeded (Block 178), the data content of the record is added to the log of film rolls not retrieved by notified customers (Block 202). After a database record from the group of selected records has been processed, server 18*a* checks to determine whether additional audit records remain (Block 194). If there are remaining records to process, another record is selected (Block 198) and the process continues (Block 178). Otherwise, the log of developed film rolls that have not been retrieved by notified customers is sent to an operator (Block 206) and server 18*a* continues to scan for data events.

Figure 3:
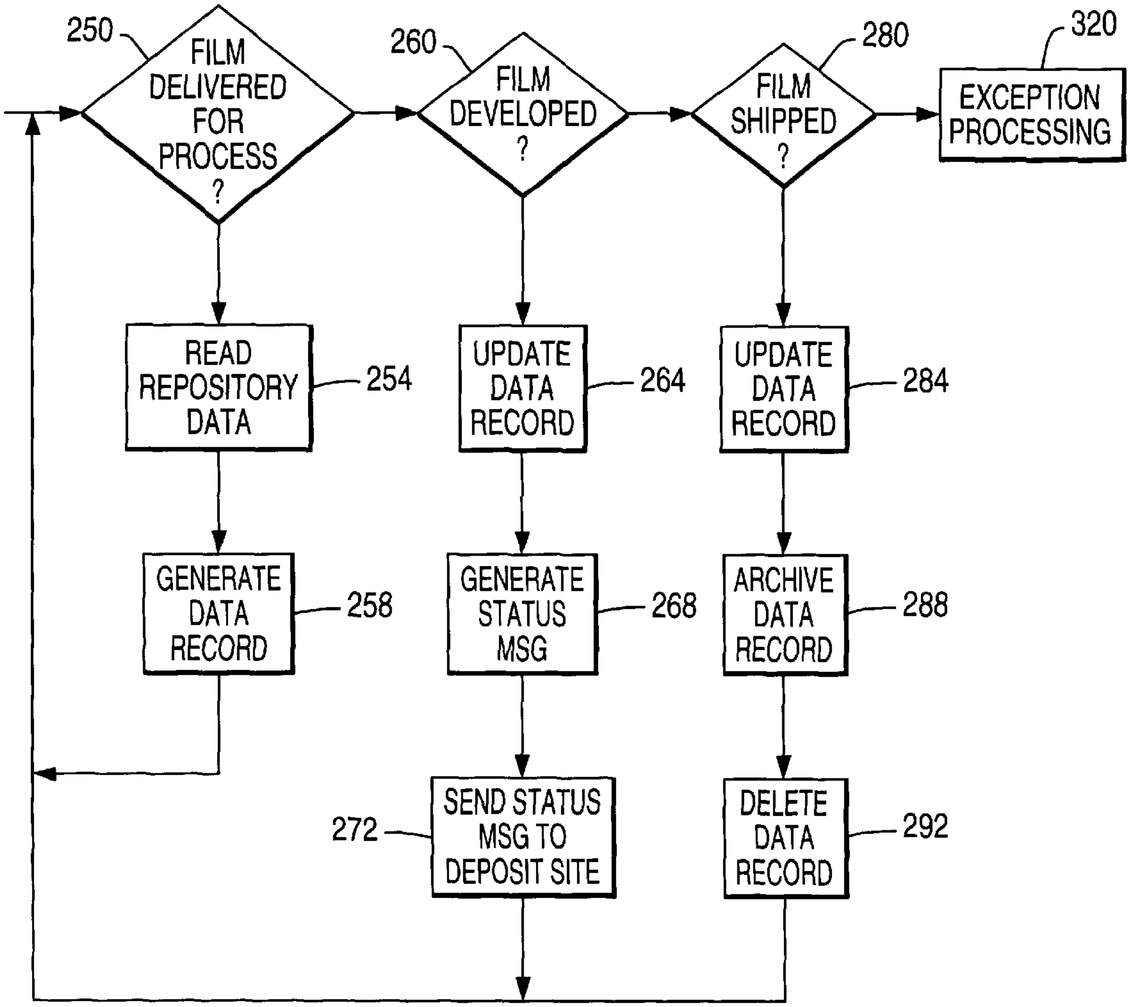
FIG. 3 is a flowchart of an exemplary method for generating and sending messages to a deposit site regarding the processing of a film roll at a processing lab.

An exemplary method implemented by server 18*b* in accordance with the principles of the present invention is shown in FIG. 3. The method begins by determining whether a film roll has been delivered for processing (Block 250), a film roll has been developed (Block 260), or a developed film roll has been shipped to its corresponding deposit site (Block 280). Otherwise, an error has occurred and exception processing takes place (Block 320). In response to determining that data capture device 20*b* is providing data for a film roll being delivered for processing (Block 250), server 18*a* reads the data repository accompanying the film roll (Block 254) to generate a data record corresponding to the delivered film roll (Block 258). The data record is preferably stored in a database coupled to server 18*b*. A data repository to accompany the film roll during processing at lab site 24 may be generated by server 18*b* if the data repository accompanying the delivered film roll is removed from the film roll after being read by data capture device 20*b*. Server 18*b* continues to scan for data events.

Figure 2B:
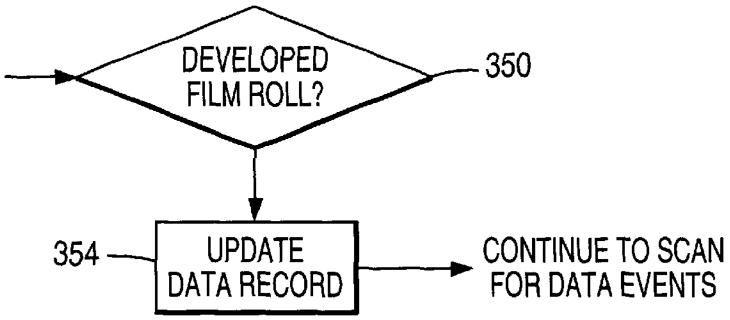
FIG. 2B is a flowchart of an exemplary method for processing status messages from a processing lab server regarding development of a film roll.

In response to data capture device 20*b* providing data corresponding to a film roll developed at lab site 24 (Block 260), server 18*b* updates the processed status in the corresponding data record (Block 264). A message notifying deposit site 14 of the developed status of the film roll may be generated (Block 268) and sent to server 18*a* (Block 272). If server 18*b* generates such a message, the data event processing shown in FIG. 2B is added to the server 18*a* processing shown in FIG. 2A. In that scenario, server 18*a* determines whether a developed film roll message has been received (Block 350, FIG. 2B) so the corresponding data record may be updated (Block 354, FIG. 2B). The developed film roll message is another data event for which server 18*a* scans. After processing the notification that a film roll has been processed (Blocks 260–272, FIG. 3), server 18*a* continues to scan for data events.

In response to being notified that a developed film roll has been shipped to its corresponding deposit site (Block 280), server 18*b* updates the shipped status of the corresponding data record (Block 284) and archives the record (Block 288). The database record is then deleted (Block 292). As discussed above with respect to the sending of a message to server 18*a* regarding development of a film roll, server 18*b* may also generate and send messages to server 18*a* regarding receipt of a film roll and/or shipment of a film roll. If server 18*b* generates and sends such messages, they are processed by server 18*a* in a manner similar to that indicated for the processing of developed film roll messages as shown in FIG. 2B.

While the present invention has been illustrated by the description of exemplary processes, and while the various processes have been described in considerable detail, it is not the intention of the applicant to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A film development and notification method, comprising the steps of:

depositing a film roll at a deposit site;

creating a data repository associated with said film roll including customer identification data and film roll data; and a label having said customer identification data and film roll data;

forwarding said film roll and said data repository to a lab site;

developing said film roll at said lab site so as to create developed film;

forwarding said developed film to said deposit site; and sending a notification message to a customer site following receipt of said developed film at said deposit site;

wherein said label is affixed to a container that contains said film roll during said step of forwarding said film roll and said data repository to said lab site.

2. The method of claim 1, wherein said data repository further includes deposit site data.

3. The method of claim 1, wherein said sending step includes the step of sending an email message to said customer site.

4. The method of claim 3, wherein:

said data repository includes customer identification data, and said email message is sent to an email address identified by said customer identification data.

5. The method of claim 3, wherein said email message is configured to inform a customer that said developed film is available for retrieval at said deposit site.

6. The method of claim 1, wherein said sending step includes the step of sending a voice message to said customer site.

7. The method of claim 6, wherein:

said data repository includes customer identification data, and said voice message is sent to a telephone number identified by said customer identification data.

8. The method of claim 6, wherein said voice message is configured to inform a customer that said developed film is available for retrieval at said deposit site.

9. The method of claim 1, wherein:

said data repository includes a bar code that possesses said customer identification data and film roll data, and said bar code is affixed to a container that contains said film roll during said step of forwarding said film roll and said data repository to said lab site.

10. The method of claim 1, further comprising the steps of:

generating a data record based on data included in said data repository; and storing said data record in a server associated with said deposit site.

11. The method of claim 10, further comprising the step of updating said data record stored in said server in response to said notification message being sent to said customer site.

12. A film development and notification method, comprising the steps of:

depositing a film roll at a deposit site;

creating a data repository associated with said film roll;

generating a data record based on data included in said data repository;

storing said data record in a server associated with said lab site;

forwarding said film roll and said data repository to a lab site;

developing said film roll at said lab site so as to create developed film;

forwarding said developed film to said deposit site;

sending a notification message to a location based on data included in said data repository after the developing step;

updating said data record stored in said server in response to said notification message being sent; and retrieving said developed film at said deposit site in response to receipt of said notification message.

13. The method of claim 12, wherein:

said data repository includes customer identification data, said notification message is an email message, and said sending step includes the step of sending said email message to an email address identified by said customer identification data.

14. The method of claim 13, wherein said email message is configured to inform a customer that said film roll deposited at said deposit site has been developed.

15. The method of claim 12, wherein:

said data repository includes customer identification data, said notification message is a voice message, and said sending step includes the step of sending said voice message to a telephone number identified by said customer identification data.

16. The method of claim 15, wherein said voice message is configured to inform a customer that said film roll deposited at said deposit site has been developed.

17. The method of claim 12, wherein said data repository includes customer identification data and film roll data.

18. The method of claim 17, wherein said data repository further includes deposit site data.

19. A film development and notification method, comprising the steps of:

depositing a film roll at a deposit site; creating a data repository associated with said film roll including customer identification data and film roll data; and a bar code that possesses said customer identification data and film roll data;

forwarding said film roll and said data repository to a lab site;

developing said film roll at said lab site so as to create developed film; forwarding said developed film to said deposit site; and sending a notification message to a customer site following receipt of said developed film at said deposit site wherein said bar code is affixed to a container that contains said film roll during said step of forwarding said film roll and said data repository to said lab site.

20. A film development and notification method, comprising the steps of:

depositing a film roll at a deposit site;

creating a data repository associated with said film roll;

generating a data record based on data included in said data repository;

storing said data record in a server associated with said deposit site;

forwarding said film roll and said data repository to a lab site;

developing said film roll at said lab site so as to create developed film;

forwarding said developed film to said deposit site;

sending a notification message to a customer site following receipt of said developed film at said deposit site; and updating said data record stored in said server in response to said notification message being sent to said customer site.

* * * * *